F. A. COLE.
VETERINARY MEDICINE SPOON.
APPLICATION FILED APR. 26, 1915.
1,175,709.
Patented Mar. 14, 1916.
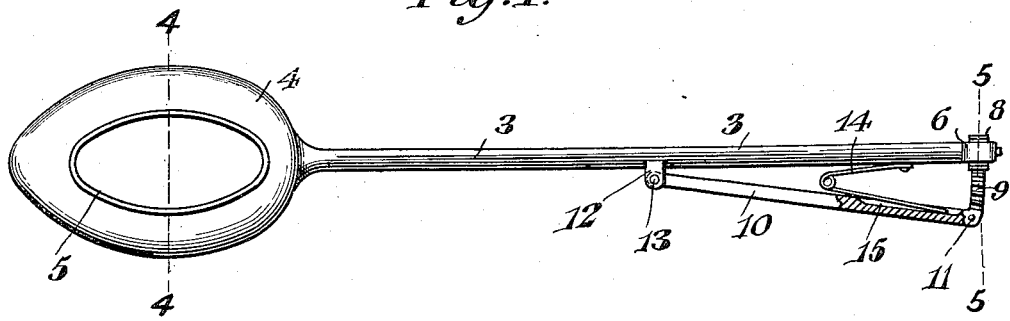
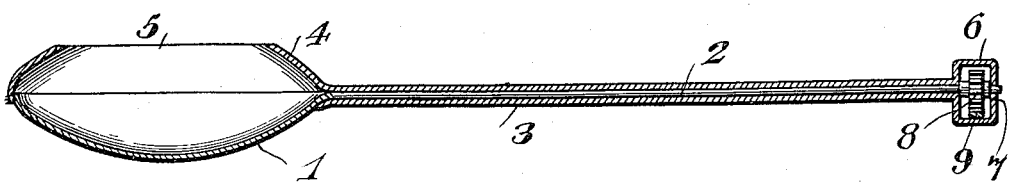
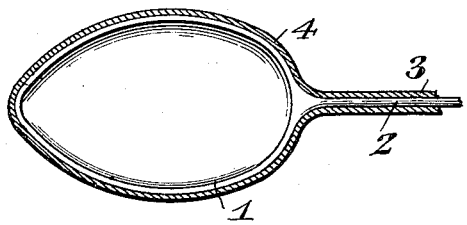
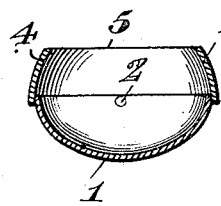
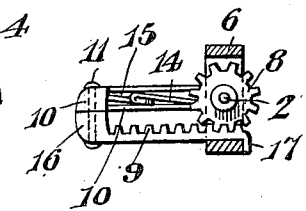
WITNESSES:
Frank A. Cole, INVENTOR
BY
Attorney

UNITED STATES PATENT OFFICE.

FRANK A. COLE, OF PENN YAN, NEW YORK.

VETERINARY MEDICINE-SPOON.

1,175,709.

Specification of Letters Patent. Patented Mar. 14, 1916.

Application filed April 26, 1915. Serial No. 24,117.

*To all whom it may concern:*

Be it known that I, FRANK A. COLE, a citizen of the United States, residing at Penn Yan, in the county of Yates and State of New York, have invented a new and useful Veterinary Medicine - Spoon, of which the following is a specification.

This invention has reference to veterinary medicine spoons, and its object is to provide a container for medicinal matters which may be readily introduced into the mouth of an animal and then its contents discharged upon the tongue of the animal as near the throat as may be desired.

The present invention comprises a body member which is generally, though not necessarily, in the form of a spoon with a bowl, and a cover member and also an elongated handle carrying means whereby the cover member may be rotated about the longitudinal axis of the spoon so as to cover and uncover the bowl, and the cover member is provided with an opening or passage through which material may be deposited in the bowl of the spoon.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention as defined in the claims.

In the drawings: Figure 1 is a plan view of a spoon embodying the present invention; Fig. 2 is a longitudinal central section thereof; Fig. 3 is a plan view of the spoon bowl with the cover member and a portion of the handle in section; Fig. 4 is a section on the line 4—4 of Fig. 1; Fig. 5 is a section on the line 5—5 of Fig. 1 with distant parts omitted and others shown on a larger scale.

Referring to the drawings, there is shown a spoon bowl 1, which as illustrated is of the usual spoon bowl shape, but it will be understood that the spoon bowl 1 may be of any suitable shape so long as it serves the purposes of a container from which the contents may be readily discharged, but which will retain its contents while being introduced into the mouth of an animal, especially such an animal as a horse. The spoon bowl is in one piece with, or secured to one end of, an elongated shaft 2, which shaft is lodged in a similarly elongated tubular handle member 3, having in one piece with, or secured to it at the end coinciding with the spoon bowl 1, a cover 4 of a size to marginally overlap the edges of the spoon bowl. The cover member 4 and the spoon bowl 1 are so shaped and related that the spoon bowl when in the inverted position may be housed in the cover member 4, considering the latter as located above the spoon bowl. However, the cover member 4 is cut away through its mid portion to form an opening 5 through which the interior of the cover is accessible.

The end of the tubular handle 3 remote from the cover 4 is provided with a laterally expanded yoke 6 into which the shaft 2 is extended with the shaft journaled if desired in the end wall 7 of the yoke. Within the yoke the shaft 2 carries a pinion 8, and this pinion is in mesh with a rack 9 connected to one end of a bar 10 by a rivet 11, or otherwise, while the other end of the bar 10 which extends toward the bowl portion of the spoon, is mounted between the ears 12 on the handle 3, and is secured thereto by a pivot 13. A spring 14 which may be fast at one end to the handle 3 is lodged between the said handle and the bar 10 and the latter is shown as provided with a longitudinal recess 15 into which one end of the spring is lodged, the recess maintaining the spring in its proper position. The rack bar, where connected to the bar 10 is provided with a side lug 16 spacing the rack bar from the bar 10 to compensate for the radial extent of the pinion 8. That end of the rack bar 9 remote from the lug 16 is outturned as shown at 17 to provide a stop to engage the yoke 6 when the bar 10 has been moved away from the handle 3 to a sufficient distance by the spring 14.

What is claimed is:—

1. A spoon provided with a bowl and a cover therefor relatively rockable one with respect to the other about an axis longitudinal of the bowl.

2. A spoon provided with a bowl and a cover therefor relatively movable one with respect to the other about the longitudinal axis of the bowl, said cover member having a passage therethrough opening into the bowl.

3. A spoon provided with a bowl and a cover therefor, a handle carrying the cover, a shaft carrying the bowl and extending lengthwise of the handle, and manipulating means for rocking the shaft about its longitudinal axis.

4. A spoon provided with a bowl and a cover therefor, a handle carrying the cover, a shaft carrying the bowl and extending lengthwise of the handle, and manipulating means for rocking the shaft about its longitudinal axis, said manipulating means comprising a pinion on the shaft, a rack engaging the pinion, and a grasping member on the handle carrying the rack.

5. A spoon provided with a bowl and a cover therefor, a handle carrying the cover, a shaft carrying the bowl and extending lengthwise of the handle, and manipulating means for rocking the shaft about its longitudinal axis, said manipulating means comprising a pinion on the shaft, a rack engaging the pinion, and a grasping member on the handle carrying the rack, said grasping member extending lengthwise of the handle and provided with a spring constraining it away from the handle.

In testimony that I claim the foregoing as my own, I have hereto affixed my signature in the presence of two witnesses.

FRANK A. COLE.

Witnesses:
OLIVER SHEPPARD,
GEO. H. EXCELL.

Copies of this patent may be obtained for five cents each, by addressing the "Commissioner of Patents, Washington, D. C."